(12) United States Patent
Saterdag et al.

(10) Patent No.: US 8,117,408 B2
(45) Date of Patent: Feb. 14, 2012

(54) BUFFER FOR OBJECT INFORMATION

(75) Inventors: Henrik Saterdag, Bad Schonborn (DE); Renzo Colle, Stutensee (DE); Daniel Zoch, Walldorf (DE)

(73) Assignee: SAP AG, Walldorf (DE)

( * ) Notice: Subject to any disclaimer, the term of this patent is extended or adjusted under 35 U.S.C. 154(b) by 568 days.

(21) Appl. No.: 11/747,048

(22) Filed: May 10, 2007

(65) Prior Publication Data

US 2008/0278198 A1 Nov. 13, 2008

(51) Int. Cl.
*G06F 7/00* (2006.01)
(52) U.S. Cl. ........ 711/161; 711/156; 707/638; 707/695; 717/122; 717/170
(58) Field of Classification Search .............. 707/1, 203; 711/156, 161, 141; 717/101–103, 170
See application file for complete search history.

(56) References Cited

U.S. PATENT DOCUMENTS

| | | | | |
|---|---|---|---|---|
| 5,943,689 | A * | 8/1999 | Tamer | 711/166 |
| 6,256,712 | B1 * | 7/2001 | Challenger et al. | 711/141 |
| 2005/0010504 | A1 * | 1/2005 | Gebhard et al. | 705/34 |
| 2005/0021354 | A1 * | 1/2005 | Brendle et al. | 705/1 |
| 2005/0022156 | A1 * | 1/2005 | Schwan et al. | 717/102 |
| 2005/0091185 | A1 * | 4/2005 | Koutyrine et al. | 707/1 |
| 2006/0095395 | A1 * | 5/2006 | Patterson | 707/1 |
| 2008/0005112 | A1 * | 1/2008 | Shavit et al. | 707/8 |
| 2008/0091690 | A1 * | 4/2008 | Ellersick et al. | 707/100 |

OTHER PUBLICATIONS

"Shared Buffer for Goods Receipt Costing" [online]. SAP Library, [no date available], [retrieved on May 10, 2007]. Retrieved from the Internet: <URL: http://help.sap.com/saphelp_erp2005vp/helpdata/en/16/c9093a0c2e2974e10000000a11408....
"Buffer Distribution" [online]. SAP Library, [no date available], [retrieved on May 10, 2007]. Retrieved from the Internet: <URL: http://help.sap.com/saphelp_erp2005vp/helpdata/en/03/17111c3d3f11d5b6a6006094b9e9b....
"Framework" [online]. SAP Library [no date available], [retrieved on May 10, 2007]. Retrieved from the Internet: <URL:http://help.sap.com/saphelp_erp2005vp/helpdata/en/43/433ae17e06601fe10000000a42203....
"Background Information" [online]. SAP Library [no date available], [retrieved on May 10, 2007]. Retrieved from the Internet: <URL http://help.sap.com/saphelp_erp2005vp/helpdata/en/43/21fa3a4a032be8e10000000a1553f7....

* cited by examiner

*Primary Examiner* — Brian Peugh
*Assistant Examiner* — Nicholas Simonetti
(74) *Attorney, Agent, or Firm* — Fish & Richardson P.C.

(57) ABSTRACT

A buffer that is state-aware and/or node-oriented. In a state-aware buffer, one or more operations relating to a state can be performed. In a node-oriented buffer, instances of a node can be accessed without regard to an object structure in which the instance is included.

45 Claims, 10 Drawing Sheets

US 8,117,408 B2

BUFFER FOR OBJECT INFORMATION

TECHNICAL FIELD

This document relates to a buffer for object information.

BACKGROUND

Computer systems can be configured for storing and managing information in any of several different ways. One approach is to group related information together in an object according to a predefined data structure. The computer system can then be provided with one or more application programs that use the objects or the information stored therein.

The storage of information or data can be organized in one or more different ways. One approach is to provide a database or other storage mechanism that is configured to hold structured information and to provide access to it as needed. An application program can then work with the database to obtain the information it needs for respective operations. If some information is updated or otherwise changed, it can be provided to the database to make sure that the storage is current.

SUMMARY

The invention relates to a buffer that is state-aware and/or node-oriented.

In a first aspect, a computer-implemented method of providing a state-aware buffer includes implementing a buffer to be used by executable logic. The buffer is capable of maintaining multiple states of information from at least one object recognized in the executable logic. The method includes providing the buffer with a function for performing an operation relating to the multiple states. The method includes providing an interface to the buffer for use by the executable logic in activating the function.

Implementations can include any, all or none of the following features. The function can be configured to cause the buffer to begin maintaining the multiple states of the information. The function can be configured to cause the buffer to compare the multiple states of the information. The function can be configured to cause the buffer to bring the information from one of the multiple states to another of the multiple states. The buffer can be implemented to exchange information with a data repository, and the function can further be configured to update the data repository to reflect that the information has been brought to the other state. The interface can be configured so that semantics of the multiple states are maintained by the executable logic. The at least one object can be configured to include nodes bearing the information, and the multiple states can correspond to states of the nodes. The at least one object can be configured for a business-related functionality and can provide at least one standard service. The buffer can be generic with regard to objects whose nodes are connected by composition associations. The buffer can be associated with a configuration that maintains any aspects that are specific to the objects, and implementing the buffer can further include: accessing the configuration before the buffer is implemented; and deriving the buffer from a template, the buffer being specific to nodes of the at least one object; wherein the configuration is not accessed at runtime. The at least one object can be configured to include a plurality of nodes, and providing the buffer with the function can further include configuring the function to access multiple instances of a first node without accessing an instance of a second node that is connected to the first node in the object.

In a second aspect, a computer program product is tangibly embodied in a computer-readable medium and includes instructions that when executed by a processor perform a method for providing a state-aware buffer. The method includes implementing a buffer to be used by executable logic. The buffer is capable of maintaining multiple states of information from at least one object recognized in the executable logic. The method includes providing the buffer with a function for performing an operation relating to the multiple states. The method includes providing an interface to the buffer for use by the executable logic in activating the function.

In a third aspect, a computer-implemented method of using a state-aware buffer includes changing a first state of information from an object stored in a buffer used by executable logic. The buffer is configured to maintain multiple states of objects recognized in the executable logic. The method includes holding a second state of the information in the buffer that reflects the change. The method includes performing an operation in the buffer requested by the executable logic, the operation relating to the first and second states.

Implementations can include any, all or none of the following features. The operation can include comparing the first state with the second state. The operation can include bringing the information in the buffer from the second state to the first state. The buffer can be implemented to exchange information with a data repository, and the operation can further include updating the data repository to reflect that the information has been brought to the first state. The buffer can be generic with regard to objects whose nodes are connected by composition associations. The buffer can be associated with a configuration that maintains any aspects that are specific to the objects, and the method can further include accessing the configuration at runtime. The method can further include receiving a request for access to a node in the buffer, the node being included in the information; accessing multiple instances of a first node without accessing an instance of a second node that is connected to the first node in the object; and generating a response to the request based on the access.

In a fourth aspect, a computer program product is tangibly embodied in a computer-readable medium and includes instructions that when executed by a processor perform a method for using a state-aware buffer. The method includes changing a first state of information from an object stored in a buffer used by executable logic. The buffer is configured to maintain multiple states of objects recognized in the executable logic. The method includes holding a second state of the information in the buffer that reflects the change. The method includes performing an operation in the buffer requested by the executable logic, the operation relating to the first and second states.

In a fifth aspect, a system includes executable logic stored in a computer-readable medium. The system includes a buffer to be used by the executable logic. The buffer has a function for performing an operation relating to multiple states of information from at least one object recognized in the executable logic. The system includes an interface to the buffer for use by the executable logic in activating the function.

Implementations can include any, all or none of the following features. The operation can be at least one selected from the group consisting of: causing the buffer to begin maintaining the multiple states of the information; causing the buffer to compare the multiple states of the information; causing the buffer to bring the information from one of the multiple states to another of the multiple states; and combinations thereof. The system can further include a data repository with which the buffer can exchange information, and after the information is brought to the other state the data repository can be updated. The interface can be configured so that semantics of the multiple states are maintained by the executable logic. The at least one object can be configured to include nodes bearing the information, and the multiple states can correspond to states of the nodes. The buffer can be generic with regard to objects whose nodes are connected by composition associations. The information can be included in a plurality of nodes of the at least one object, each of the nodes including at least a data part and a key part. The buffer can be configured to accept any type of the data parts. The buffer can be associated with a configuration that maintains any aspects that are specific to the objects. The information can be included in a plurality of nodes of the at least one object, and the interface can further be configured for requesting access to multiple instances of a first node without accessing an instance of a second node that is connected to the first node in the object.

In a sixth aspect, a computer-implemented method of providing a node-oriented buffer includes implementing a buffer for use by executable logic. The buffer is configured to hold information from objects recognized in the executable logic. Each of the objects is configured to include a plurality of nodes. The method includes providing the buffer with a function to access multiple instances of a first node without accessing an instance of a second node that is connected to the first node in the object. The method includes providing an interface to the buffer for use by the executable logic in activating the function.

Implementations can include any, all or none of the following features. Each of the nodes can include at least a data part and a key part. Implementing the buffer can further include configuring the buffer to accept any type of the data parts. Implementing the buffer can further include configuring the buffer to organize the nodes by the key parts. Implementing the buffer can further include providing each of the key parts with at least a node instance key, a parent node instance key, and a root node instance key. The buffer can be implemented to exchange information with a data repository, and the function can further be configured to update the data repository to reflect that the information has been brought to another state. The at least one object can be configured for a business-related functionality and provides at least one standard service. The buffer can be generic with regard to objects whose nodes are connected by composition associations. The buffer can be associated with a configuration that maintains any aspects that are specific to the objects, and implementing the buffer can further include: accessing the configuration before the buffer is implemented; and deriving the buffer from a template, the buffer being specific to nodes of the at least one object; wherein the configuration is not accessed at runtime. Implementing the buffer can further include: providing the buffer to be capable of maintaining multiple states of the information; and providing the buffer with a function for performing an operation relating to the multiple states.

In a seventh aspect, a computer program product is tangibly embodied in a computer-readable medium and includes instructions that when executed by a processor perform a method for providing a node-oriented buffer. The method includes implementing a buffer for use by executable logic. The buffer is configured to hold information from objects recognized in the executable logic. Each of the objects is configured to include a plurality of nodes. The method includes providing the buffer with a function to access multiple instances of a first node without accessing an instance of a second node that is connected to the first node in the object. The method includes providing an interface to the buffer for use by the executable logic in activating the function.

In an eighth aspect, a computer-implemented method of using a node-oriented buffer includes receiving a request for access to a node in a buffer for use by executable logic. The node is included in information from an object recognized in the executable logic. The method further includes accessing multiple instances of a first node without accessing an instance of a second node that is connected to the first node in the object. The method further includes generating a response to the request based on the access.

Implementations can include any, all or none of the following features. Each of the nodes can include at least a data part and a key part. Accessing the multiple instances can include using the key parts. Each of the key parts can include at least a node instance key, a parent node instance key, and a root node instance key. The buffer can be implemented to exchange information with a data repository, and the method can further include updating the data repository to reflect that the information has been brought to another state. The buffer can be generic with regard to objects whose nodes are connected by composition associations. The buffer can be associated with a configuration that maintains any aspects that are specific to the objects, and the method can further includes accessing the configuration at runtime. The method can further includes changing a first state of the information; holding a second state of the information in the buffer that reflects the change; and performing an operation in the buffer requested by the executable logic, the operation relating to the first and second states.

In a ninth aspect, a computer program product is tangibly embodied in a computer-readable medium and includes instructions that when executed by a processor perform a method for using a node-oriented buffer. The method includes receiving a request for access to a node in a buffer for use by executable logic. The node is included in information from an object recognized in the executable logic. The method includes accessing multiple instances of a first node without accessing an instance of a second node that is connected to the first node in the object. The method includes generating a response to the request based on the access.

In a tenth aspect, a system includes executable logic stored in a computer-readable medium. The system includes a buffer to be used by the executable logic. The buffer is configured to hold information from objects recognized in the executable logic, each of the objects configured to include a plurality of nodes. The system includes an interface to the buffer for use by the executable logic in requesting access to multiple instances of a first node without accessing an instance of a second node that is connected to the first node in the object.

Implementations can include any, all or none of the following features. The system can further include a data repository with which the buffer can exchange information, and after the information is brought to another state the data repository can be updated. The buffer can be generic with regard to objects whose nodes are connected by composition associations. Each of the nodes can include at least a data part and a key part. The buffer can be configured to accept any type of the data parts. The buffer can organize the nodes by the key parts. Each of the key parts can include at least a node instance key, a parent node instance key, and a root node instance key. The buffer can be associated with a configuration that maintains any aspects that are specific to the objects Implementations can provide any, all or none of the following advantages: providing an improved buffer to a repository; providing that information states are maintained in a buffer; providing a buffer that is node-oriented; providing an improved buffer that is generic to node associations in object.

The details of one or more embodiments are set forth in the accompanying drawings and the description below. Other features and advantages will be apparent from the description and drawings, and from the claims.

DESCRIPTION OF DRAWINGS

Like reference symbols in the various drawings indicate like elements.

DETAILED DESCRIPTION

Figure 1:
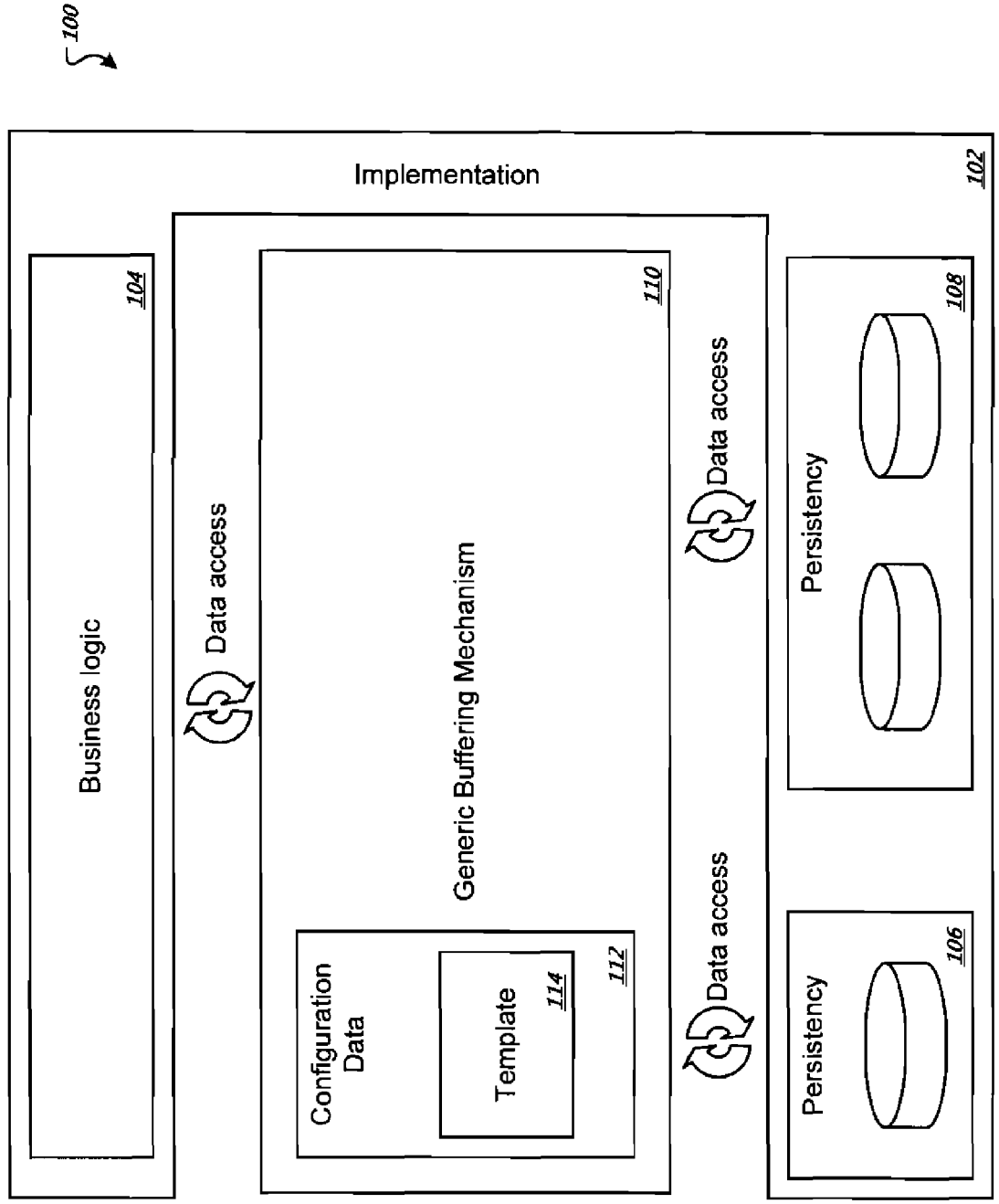
FIG. 1 is a block diagram of a system that can be used to buffer one or more instances of data or to write the data to a repository.

FIG. 1 is a block diagram of a system 100 that can be used to buffer one or more instances of data or to write the data to a repository. An implementation 102 has one or more portions of business logic 104 and one or more persistency repositories 106-108. The business logic 104 can be executable logic that performs some business-related task(s). Such tasks can include the processing of an order, the handling of an invoice, and the management of a leave request, to name just a few examples. Each business logic 104 has one or more associated objects for use in the task(s). Such objects can in some implementations be considered "business" objects because they are used in a business process as a component that represents a specific entity, aspect, function or task. Accordingly, the business logic 104 recognizes one or more objects for use in performing business functions. The persistency repositories 106-108 can be used to hold data relating to the business logic 104. The implementation 102 may have an interface to a buffer 110. As another example, the buffer 110 may contain the interface to the implementation 102. The interface allows for data access between the buffer 110 and the implementation 102. Further, the buffer 110 can read and write to the persistency repositories 106-108 through data access, for example.

In one implementation, the buffer 110 can be considered a state aware buffer. For example, the state aware buffer can maintain and compare multiple states of information at the request of the implementation 102. As another example, upon request from the implementation 102 the buffer can perform functionality on the states such as to bring one state of information to another.

An example of a process for the state aware buffer implementation involves the business logic 104 executing a command or request to perform some task. In response, the buffer 110 can be notified by the logic to perform some operation on one or more objects. Here, the object can be configured to include nodes bearing information. The object can have multiple states, with the multiple states corresponding to the states of the nodes.

The buffer 110 can be generic with regard to the objects whose nodes are connected by composition associations. For example, the buffer makes no assumptions about the node composition relations nor about the data structure of the objects. The data structure could be any of a number of structures such as an object reference, a data structure, or an XML file, to name a few examples. The nodes may be connected directly or indirectly by composition associations.

The buffer 10 maintains multiple states of information. The business logic 104 may perform a step of processing in which one state of information is used. The buffer 110 can save this state of information in an object corresponding to that particular state. Another step in the performance of the logic may thereafter be executed and the buffer 110 can maintain the new state of information within a different object. There may be any number of states of information within the buffer 110.

The implementation 102 can be aware of the semantics of the different states of information of the different objects within the buffer 110. The state aware buffer 110 can, at the request of the implementation 102, compare multiple states of information or bring an object from one state of information to another, to name two examples. The information within the objects can in some implementations be written to one or more of the persistency repositories 106-108. In implementations using transient data, no persistency may exist.

In the above or another implementation of the buffer 110, the buffer can be considered node orientated. In such an implementation data can be accessed from an individual node without necessarily accessing data from other nodes before or after the node. For example, there may be a series of nodes within an object. If information about the last node in the series is to be accessed, there is no need to also retrieve or step through the data preceding the last node. Rather, the node of interest, and other instances thereof, can be directly accessed.

To begin a process of the node orientated buffer in the present example, the business logic 104 can start by executing a command or request to perform some task. The information for multiple instances of the objects can be stored in the buffer.

The buffer 110 can be generic with regard to objects whose nodes are connected by composition associations. For example, the buffer may make no assumptions about the node composition relations nor about the data structure of the objects. However, the nodes may be connected directly or indirectly by composition associations.

Each object can be configured to have a plurality of nodes. The nodes can contain data and a key which is used to access the node. The nodes correspond to different data at different instances of the business logic 104 runtime. The buffer 110 can access multiple instances of a node without accessing other nodes because the buffer is node-orientated. The keys within each node can be used to access individual nodes. The data within the nodes can optionally be written to one or more of the persistency repositories 106-108. The business logic 104 can have an interface with the buffer 110 for performing various functions on the nodes such as reverting back to a different set of data or comparing two instances of a node, to name two examples.

The buffer 110 can be created in any of multiple separate ways. A first one can be considered a generated implementation. There, the buffer 110 can be created from a template 114 and is based on one of the objects from the business logic 104. The configuration in this implementation can be accessed for initial setup and not used during runtime. In another implementation the buffer 110 can be considered a generic implementation. There, the buffer 110 can be notified at run time of the business logic 104 and the buffer configuration 112 is accessed during run time. The buffer can be set up on an as needed basis at each runtime event.

Figure 2:
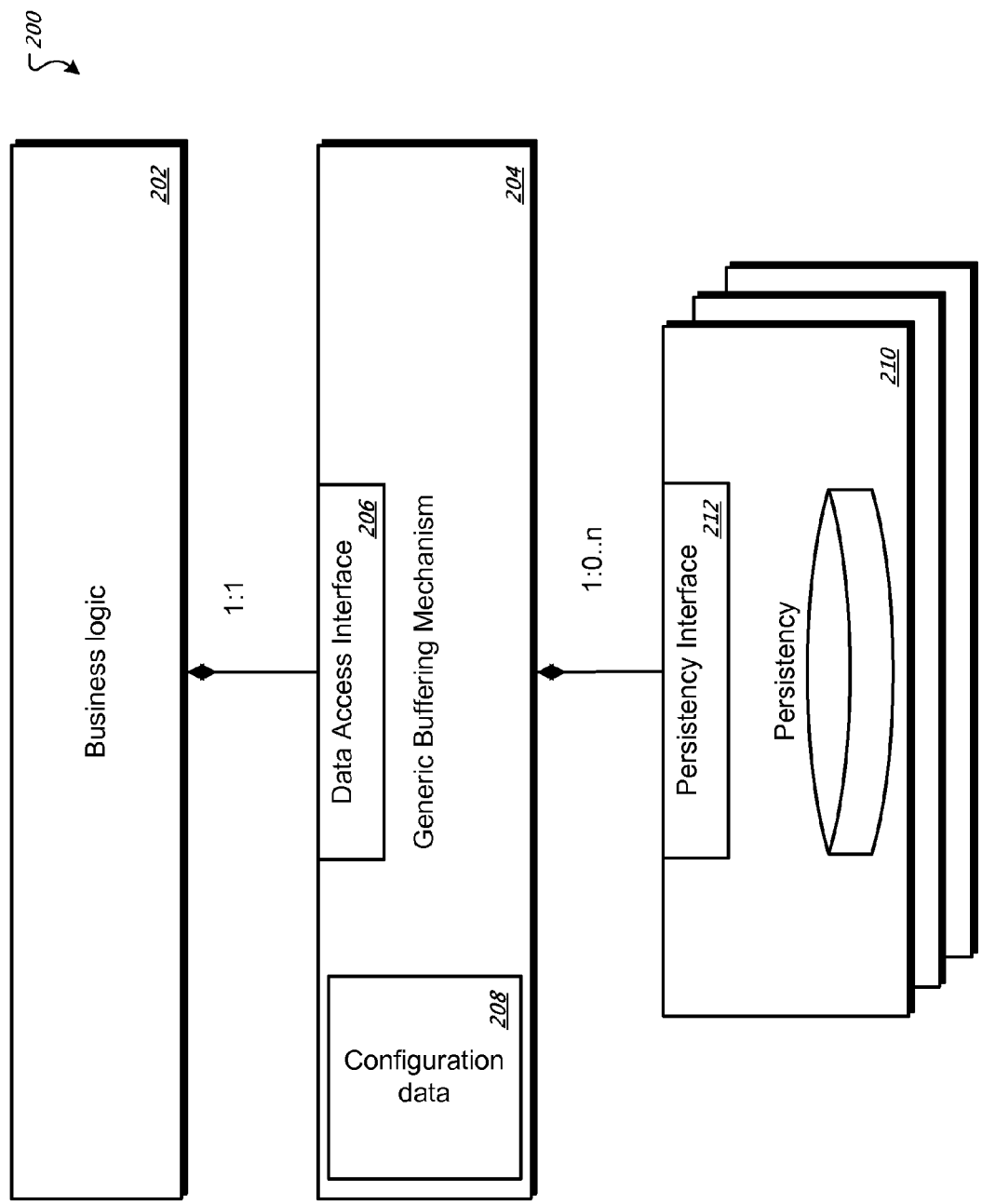
FIG. 2 is a block diagram of a system illustrating a relationship between a buffer and components of an implementation.

FIG. 2 is a block diagram of a system 200 that illustrates a relationship between a buffer and components of an implementation. A business logic 202 can be executable logic that performs some business-related task(s). Such tasks can include the processing of an order, the handling of an invoice, and the management of a leave request, to name just a few examples. The tasks can be the same as the tasks in FIG. 1. The business logic 202 may interface with a generic buffering mechanism 204 using a data access interface 206. The data access interface 206 can be designed for retrieval, modification and execution of one or more selected operations on transactional data. Moreover, some or all such data can be transient (i.e., not needing a persistency). Any number of business logics 202 may exist within an implementation. Each business logic 202 may have its own interface for data access with the data access interface 206 (i.e. a one to one relationship). Information can be transferred in either direction between the business logic 202 and the data access interface 206 within the buffer. The generic buffering mechanism 204 may contain a configuration data 208 portion. The data within the configuration data 208 can be used to configure the generic buffering mechanism 204. The configuration data 208 may be specific to an object within the business logic 202.

In the described implementation, no configuration information is transferred via the data access interface 206. Indeed, the implementation can be arranged so that the business logic need not access any configuration during runtime. However, if a business logic should need configuration access during runtime, it can define its own configuration and this can be maintained separately from the original configuration. These configurations can thereafter be maintained separately or merged, for example in the case where they largely overlap.

The generic buffering mechanism 204 may also have data access to a persistency repository 210 through a persistency interface 212. Any number of persistency repositories 210 may exist within an implementation. Each buffer can have data access with no persistency interfaces 210 or any number of persistency interfaces 210 (i.e. a 1:0.n relationship). The buffering mechanism may, in some implementations, write data to the persistency repository 210. The data can be transferred to the persistency repository 210 by means of the persistency interface 212. Data may also be read by the buffering mechanism 204 from the persistency repository 210 through the persistency interface 212. In an implementation that uses transient data, it may not be necessary to write any data from the buffer to the persistency repository 210.

For example, the buffering mechanism 204 may write persistent data to the persistency repository 210 using the persistency interface 212. This may be done because the buffer no longer needs to maintain this particular set of data. As another example, the buffer mechanism can retrieve data through the persistency interface 212 from the persistency repository. In addition, the business logic 202 may have requested the data for performing an operation on it. The buffering mechanism can therefore make the data available to the business logic 202 through the data access interface 206.

Figure 3:
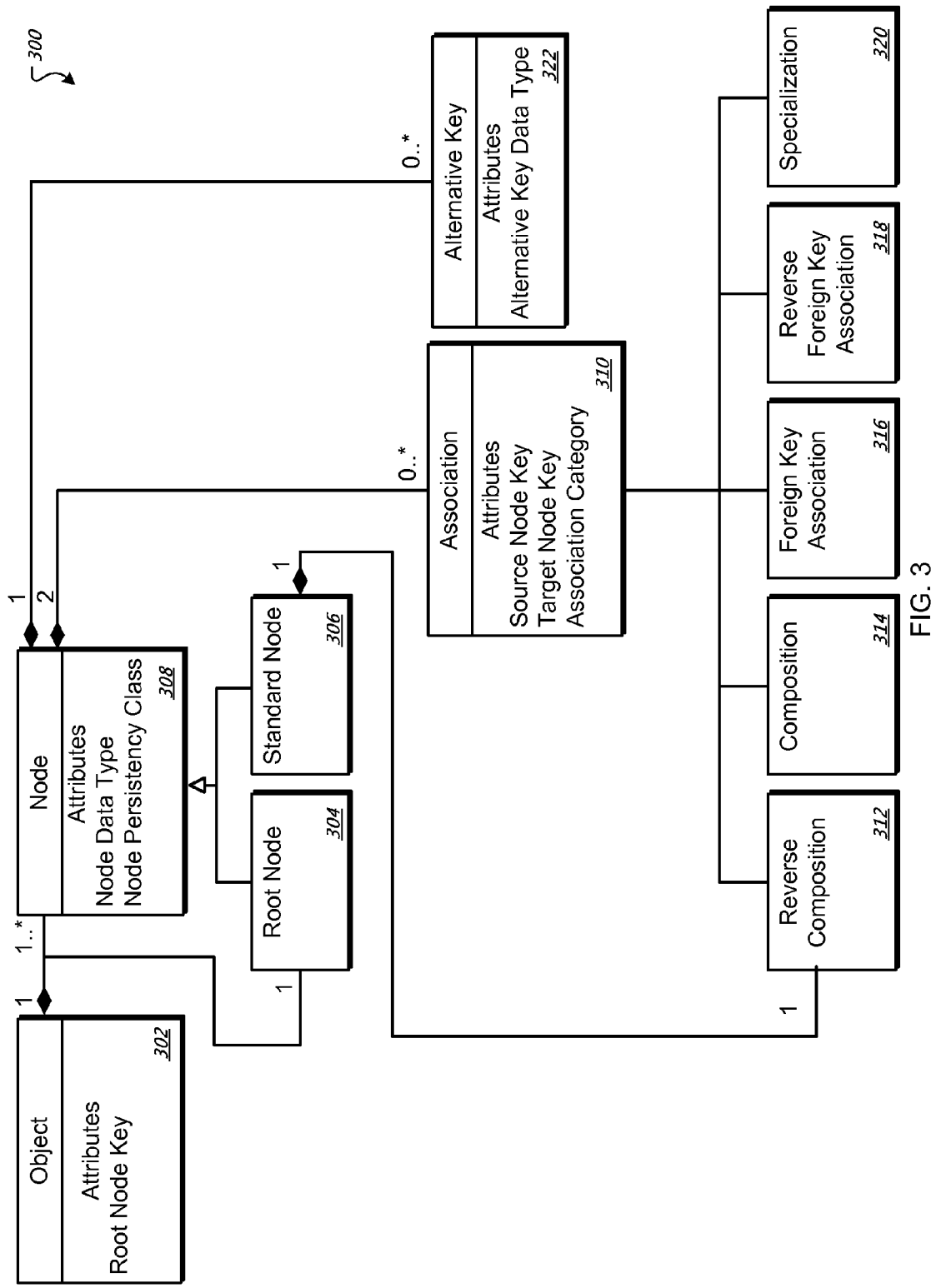
FIG. 3 is a block diagram of a structure that can be used in an implementation of a buffer configuration.

FIG. 3 is a block diagram of a structure 300 that can be used in an implementation of a buffer configuration. An object 302 may contain the information about an object root node 304. The root node 304 can be the highest node in a hierarchy of nodes and a standard node 306 can be any other node in the hierarchy. A node 308 may contain the information about the typing of its data part and the information about the persistency repository. The data part can be fully generic and can be of any type. In some implementations, this means that the buffer need not make assumptions about the typing of the data part. In this example, nodes can be connected with composition associations and reverse composition associations. Each object can have multiple nodes 308 and each node 308 can have a data type and a persistency class. An association 310 may contain the information to identify which node is the source node and which node is the target node in any portion of the hierarchy. In some implementations, each association 310 may be one of the following types: a reverse composition association 312, a composition association 314, a foreign key association 316, a reverse foreign key association 318, or a specialization 320 association. Objects may have an alternative key 322. The alternative key 322 may contain the alternative key data type. The alternative node key may belong to one node. It may contain the information about the typing of the alternative node key.

The buffer may organize the node instances by the key part, whose type can be set by the buffer. The key part can include three elements: the node instance key, the parent node instance key, and the root node instance key. This may enable the buffer to resolve any composition association. The whole data can be stored in one runtime table. Such an implementation can provide an efficient access since every node access can be done with the table key information of state, node and node instance key.

In implementations where the nodes are structure-like, the buffer may be capable of resolving a number of association patterns such as foreign key associations, reverse foreign key associations and specialization associations. The necessary information about the node data (which contains the key/specialization relevant data) structure can be maintained in the configuration. If, for example, node N1 has a foreign key association to node N2, the configuration can maintain the information that the value of the foreign key K can be found in field F of node N1. Being able to access this configuration information can provide the advantage in which the buffer can resolve these association patterns without calling any additional object specific implementation.

As an example, the business object 302 can have a root node key. All other nodes within the hierarchy of that object should have the same root node key. The node 308 may contain some type of data such as a date. It may also have a persistency class which may indicate the class of data the node can optionally be written to. The node 308 can be the root node 304 if it is the first node in the hierarchy of nodes. If it is not the first node in the hierarchy, it can be a standard node 306. The node 308 may have an association 310 which may contain a key for the source node and the target node. The association 310 also may contain the association category which can be one of the following: a reverse composition association 312, composition association 314, foreign key association 316, reverse foreign key association 318, or a specialization 320 association. The node may also have the alternative key 322 which may provide an alternative key for the node to use to type information to.

Figure 4:
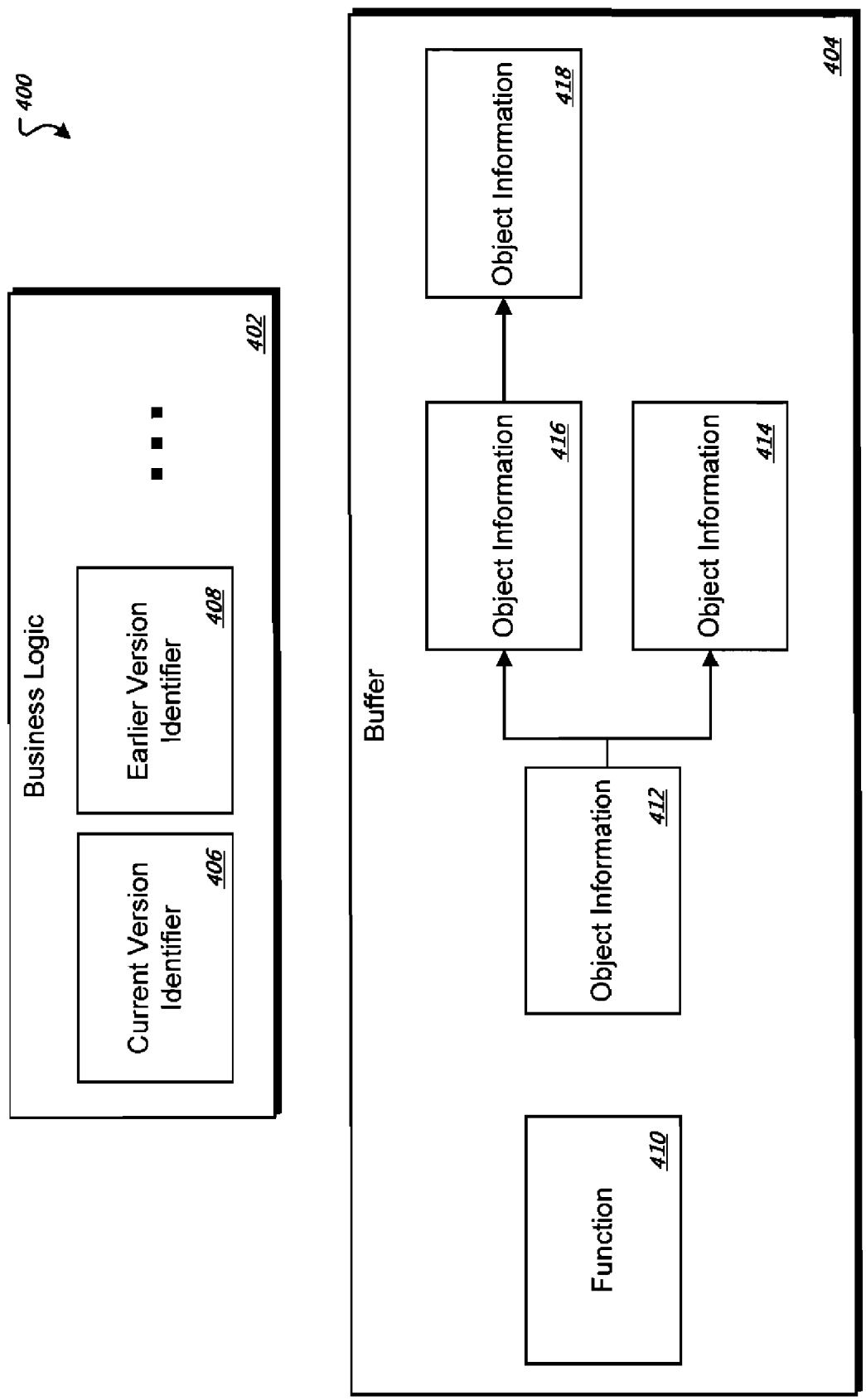
FIG. 4 is a block diagram of an architecture which shows one example of a buffer with multiple states of object information.

FIG. 4 is a block diagram of an architecture 400 which shows one example of a buffer with multiple states of object information. One or more portions of business logic 402 can include business related executable logic that performs some specific task(s). Such tasks can include the processing of an order, the handling of an invoice, and the management of a leave request, to name just a few examples. For example, the business logic 402 can be the same as, or similar to the business logic 104 of FIG. 1.

The business logic 402 may be aware of the semantics of various states held in the buffer. For this purpose, the logic may have a current version identifier 406 that identifies a current version of information (such as an object), and an earlier version identifier 408 that identifies an earlier version of information. The business logic 402 may use a buffer 404 to maintain multiple states of information relating to any or all of objects 412-418. The current version identifier 406 may contain information about the current object information being used by the business logic 402. The earlier version identifier 408 may contain information about the most recent or earlier state(s) of object information used. Accordingly, the business logic 402 can track the object information 412-418 in the buffer using at least the current version identifier 406 and the earlier version identifier 408.

For example, the business logic 402 performs an operation and the first object information state 412 is created. Later, another operation is performed and a second object information state 414 is created that differs from the first state in one or more regards. Thus, two states of the information exist at this point, and the state 414 in some examples can be considered the current state or version. The business logic 402 may for some reason need to go back to the first object information state 412. The buffer can provide this functionality and perform the transition at the request of the logic.

After returning back to the first object information 412 state, another operation may be performed. This may create a new object information state 416 that differs in one or more respects from either or both of the states 412 and 414. Thus, three states of the information exist at this point, and the state 416 in some examples can be considered the current state or version. While the new object information state 416 is considered the current one, another operation may be performed. This can create another new object information state 418. Thus, four states of the information exist at this point, and the state 418 in some examples can be considered the current state or version. The object is aware of the semantics of the different states and can use data in any of the object information states or cause the buffer to transition one of them into another, to name a few examples.

The buffer may contain a function 410 which can be used to perform one or more operations relating to multiple states of object information. One such example of a function that can be performed is to begin maintaining states in the buffer as information is edited or otherwise changed. Another example of a function is to compare different versions of objects with data at different points in time. The different versions of objects may come from having used different version of logic in the business logic 402 or from performing an operation on object data that causes it to assume a new state. The output of the comparison can be an assessment of difference between the state, if any, or the performance of an action triggered by the difference, to name just a few examples.

The function 410 can manage and/or call functionality to be performed on the various objects. Such functionality may include data retrieval, data modification, transactional functionality (save, cleanup), and state related functionality (state creation, state comparison) to name a few examples.

An example of the functionality performing data retrieval is as follows. A node instance may have a key part and a data part. The node can be assembled either via a direct key access with the key information: state, node and node instance key or via the association information: state, source node, source instance key and other association information that can be specific to the respective association category. The data retrieval can be mass enabled. Moreover, data retrieval can be the conversion of alternative node keys. A node can have multiple alternative keys that can be specified in the configuration. The buffer can generically retrieve the node instances of the provided alternative key data and can return the node instance keys.

Figure 5:
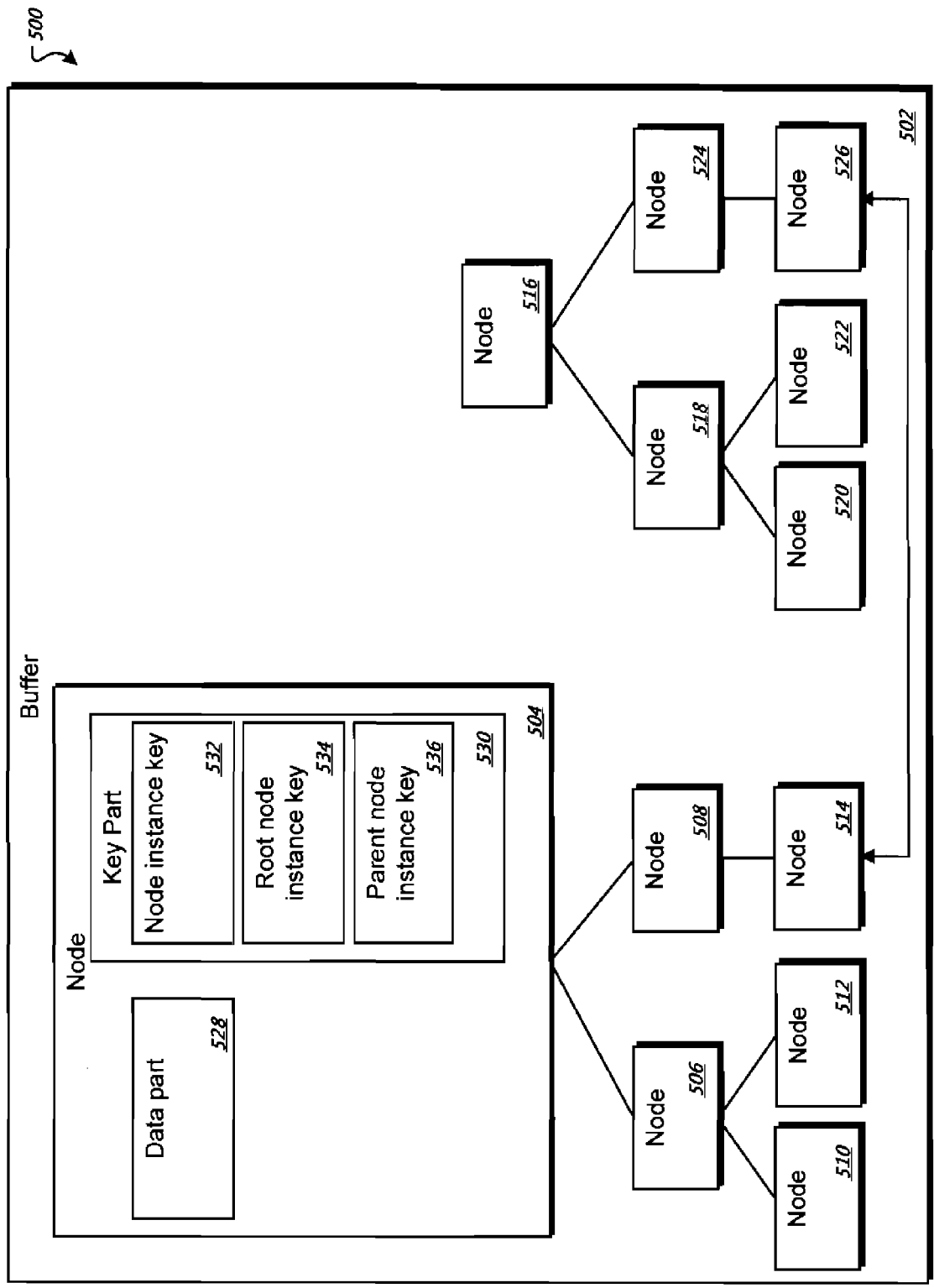
FIG. 5 is a block diagram of a generic buffer which contains an example of nodes.

FIG. 5 is a block diagram of a generic buffer 500 which contains an example of nodes. A buffer can contain multiple objects which may have multiple sets of nodes 504-526. The exemplary node 504 depicts the components which may exist in all of the nodes 506-526. The exemplary node 504 may be considered the root node of the nodes 504-514. Similarly the node 516 can be considered the root node of the nodes 516-526 but its content is not explicitly shown, for clarity.

Here, the node 504 includes a data part 528 and a key part 530. The data part 528 can be used to hold any type or form of data. The key part may contain a node instance key 532, a root node instance key 534 and a parent node instance key 536. The node instance key 532 may contain a key which can be unique to each node instance. The node instance key 532 can be used to access each individual node. The root node instance key 534 may contain a key which indicates which node in the hierarchy of nodes is the highest node. This can allow navigation directly from the current node to the root node. The parent node instance key 536 can be used to store a key which may indicate which, if any, node precedes the node 504 in the hierarchy, allowing a navigation from the current node to its parent node.

Within the buffer 502 there may be multiple clusters of node hierarchies. Each hierarchy of nodes can correspond to the node structure within an object. This exemplary configuration can be considered node-oriented buffering. Multiple instances of a node can be accessed without accessing other instances of nodes in an object. For example, different sets of nodes may correspond to different states of an object. In the present illustration, an end node 514 in a set of nodes can be accessed without accessing other nodes in the object. In a separate object, another instance of the same end node 526 can be accessed without accessing other node instances in the object. Thus, when a user accesses the node 514 in a first object, the access of another instance of that node (i.e., the node 526 in this example), is convenient and direct and need not involve navigation to any other node in the same hierarchy as the original node. Thus, the buffer can be considered node-oriented as opposed to, for example, object oriented.

FIGS. 6, 7, 8 and 9 are flow charts showing examples of processes 600, 700, 800, and 900, respectively. In short, process 600 relates to providing, and process 700 to using, a state-aware buffer, respectively. Process 800 relates to providing, and process 900 to using, a node-oriented buffer, respectively. In some implementations, part or all of more than one of the methods can be performed. For example, the methods 600 and 800 can be performed to provide a buffer (e.g., the buffer 110) that is state-aware and node-oriented. In such an example, either or both of the methods 700 and 900 can be performed. Any or all of the processes 600, 700, 800, and 900 may be performed, for example, by a processor reading executable instructions in a computer readable medium, in a system such as system 100.

For clarity of presentation, the description that follows uses one or more of the systems of preceding description as the basis of examples for describing the processes 600, 700, 800, and 900. However, another system, or combination of systems, may be used to perform any or all of the processes 600, 700, 800, or 900. Also, one or more other steps can be performed before, in between or after the steps in any or all of the processes 600-900 but are not shown herein for clarity.

Figure 6:
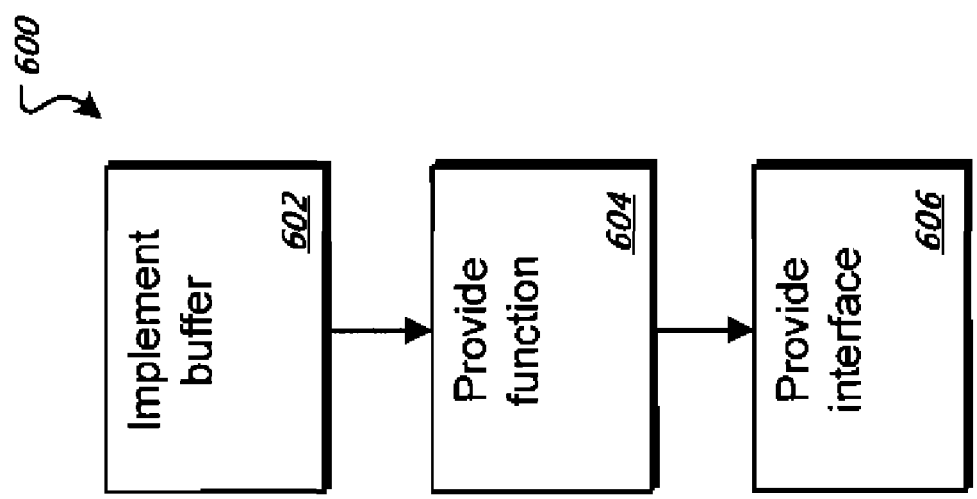
FIG. 6 is a flow chart which shows an example of a method to provide a state-aware buffer.

Referring to FIG. 6, the flow chart shows an example of a method to provide a state-aware buffer. The process 600 begins in step 602 by implementing a buffer to be used by executable logic. The buffer is capable of maintaining multiple states of information from at least one object recognized in the executable logic. For example, in FIG. 4, the buffer 404 can be implemented for use by the business logic 402. The buffer 404 can maintain multiple states of object information 412-418 for an object associated with the business logic 402.

The process 600 can continue in step 604 by providing the buffer with a function for performing an operation relating to the multiple states. For example, in FIG. 4, the buffer 404 can be provided with the function 410 to perform tasks on the different states of object information 412-418. Such tasks may include beginning to maintain multiple states, copying one state to another, comparing states, or deleting a state, to name a few examples.

The process 600 can continue in step 606 by providing an interface to the buffer for use by the executable logic in activating the function. For example, in FIG. 2, the business logic 202 can use the data access interface 206 to activate and/or the function in the buffer 204.

Figure 7:
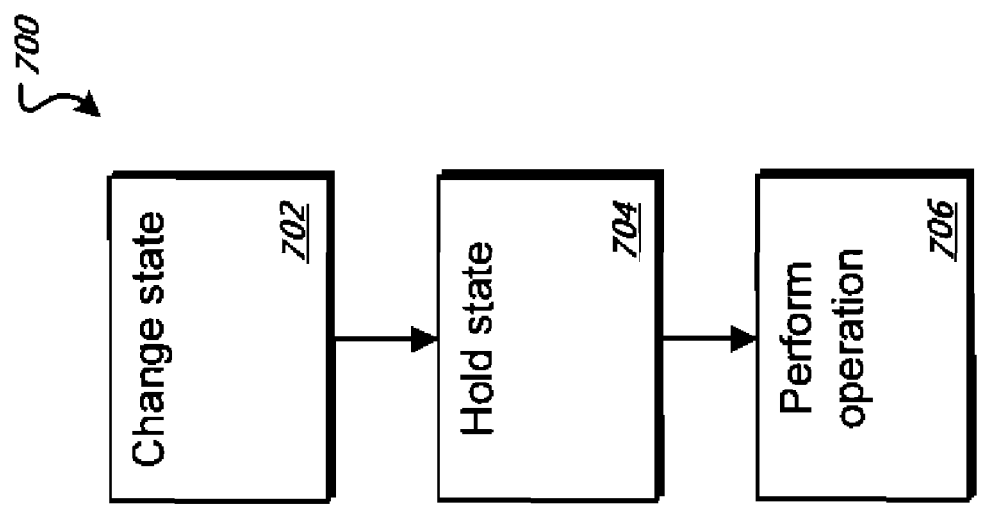
FIG. 7 is a flow chart which shows an example of using a state-aware buffer.

Referring to FIG. 7, the flow chart shows and example of using a state-aware buffer. The process 700 begins in step 702 by changing a first state of information from an object stored in a buffer used by executable logic. The buffer is configured to maintain multiple states of objects recognized in the executable logic. For example, in FIG. 4, the first state of object information 412 can change to a second state. The process 700 continues in step 704 by holding a second state of information the buffer that reflects the change. For example, in FIG. 4, the first state of object information 412 can change to a second state and a new object information state 414 can be created which can reflect the change. The process 700 continues in step 706 by performing an operation in the buffer requested by the executable logic. The operation relates to the first and seconds states. For example, in FIG. 4, the business logic 402 may request for a comparison to be performed on the first object information state 412 and/or on the second object information state 414.

Figure 8:
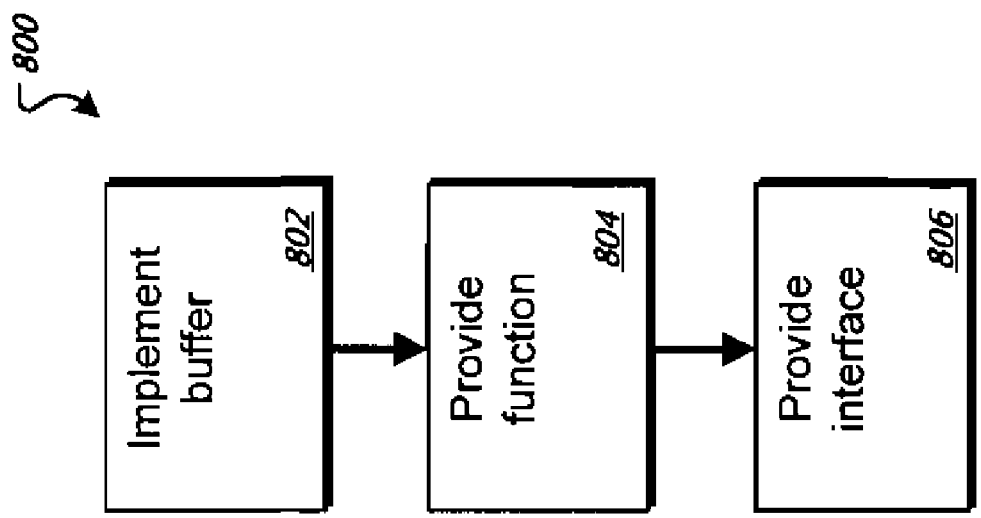
FIG. 8 is a flow chart which shows an example of a method to provide a node-oriented buffer.

Referring to FIG. 8, the flow chart shows an example of a method to provide a node-oriented buffer. The process 800 begins in step 802 by implementing a buffer for use by executable logic. The buffer is configured to hold information from objects recognized in the executable logic. Each of the objects is configured to include a plurality of nodes. For example, in FIG. 5, the buffer 500 is implemented for use by business logic and may be configured to hold a plurality of nodes 504-526. The process 800 further continues in step 804 by providing the buffer with a function to access multiple instances of a first node without accessing an instance of a second node that is connected to the first node in the object. For example, in FIG. 5, the buffer can have a function to access multiple instances of a node, such as node 514 and node 526, without accessing other nodes. The process 800 continues in step 806 by providing an interface to the buffer for use by the executable logic in activating the function. For example, in FIG. 1, the business logic 104 has data access to the buffer 110.

Figure 9:
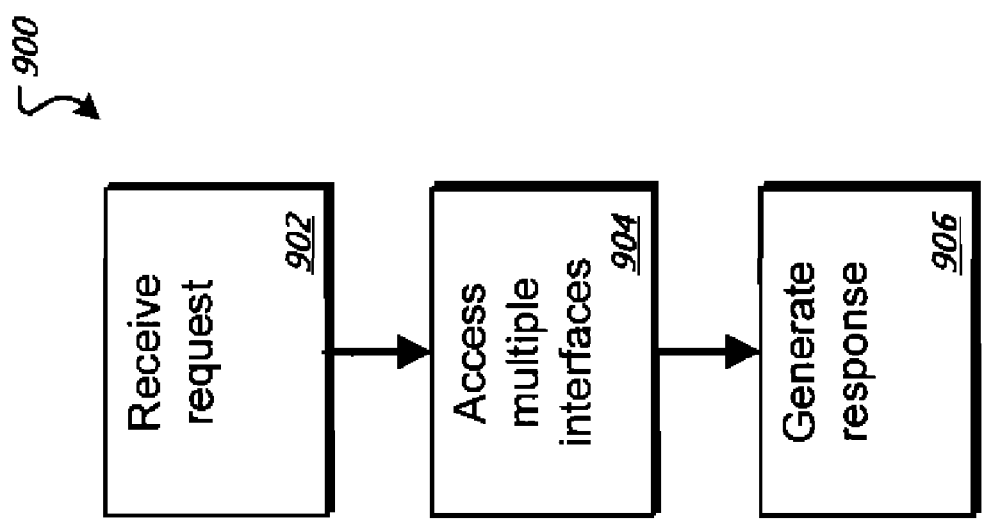
FIG. 9 is a flow chart which shows an example of using a node-oriented buffer.

Referring to FIG. 9, the flow chart shows an example of using a node-oriented buffer. The process 900 begins in step 902 by receiving a request for access to a node in a buffer for use by executable logic. The node is included in information from an object recognized in the executable logic. For example, in FIG. 5, the business logic may receive a request to access a node in either of the hierarchies. The process 900 can continue in step 904 by accessing multiple instances of a first node without accessing an instance of a second node that is connected to the first node in the object. For example, in FIG. 5 a particular node 514, and the other instance thereof (node 526), can be accessed without accessing nodes 504-506 that precede the first node, for example. The process 900 can continue in step 906 by generating a response to the request based on the access. For example, in FIG. 5, the response can include some information obtained in the access of the node 526.

Figure 10:
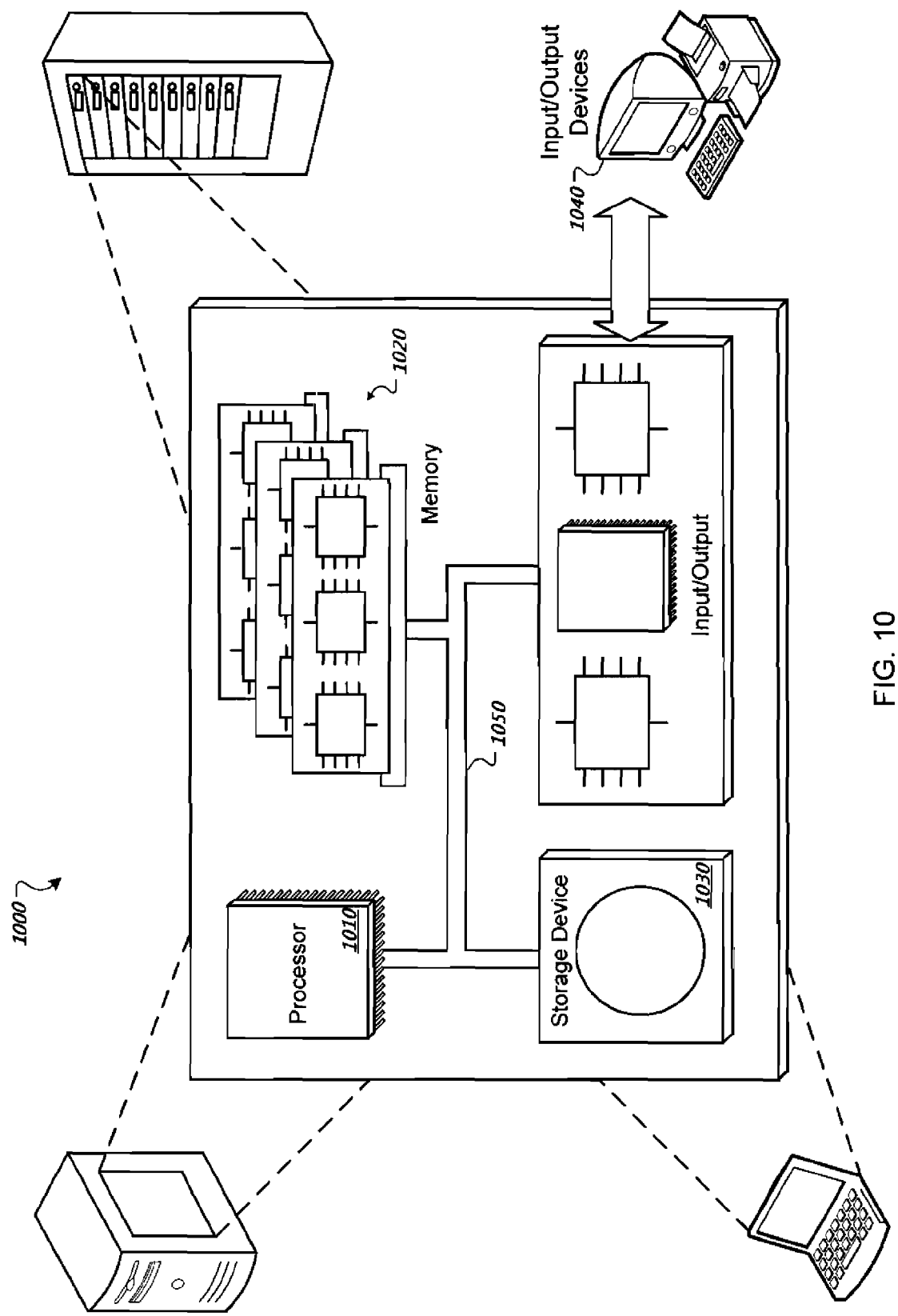
FIG. 10 is a block diagram of a computing system that can be used in connection with computer-implemented methods described in this document.

FIG. 10 is a schematic diagram of a generic computer system 1000. The system 1000 can be used for the operations described in association with any of the computer-implement methods described previously, according to one implementation. The system 1000 includes a processor 1010, a memory 1020, a storage device 1030, and an input/output device 1040. Each of the components 1010, 1020, 1030, and 1040 are interconnected using a system bus 1050. The processor 1010 is capable of processing instructions for execution within the system 1000. In one implementation, the processor 1010 is a single-threaded processor. In another implementation, the processor 1010 is a multi-threaded processor. The processor 1010 is capable of processing instructions stored in the memory 1120 or on the storage device 1030 to display graphical information for a user interface on the input/output device 1040. The system may be implemented, for example, on an individual computer 1000 or on a parallel cluster of computer systems 1000 distributed over a network.

The memory 1020 stores information within the system 1000. In one implementation, the memory 1020 is a computer-readable medium. In one implementation, the memory 1020 is a volatile memory unit. In another implementation, the memory 1020 is a non-volatile memory unit.

The storage device 1030 is capable of providing mass storage for the system 1100. In one implementation, the storage device 1030 is a computer-readable medium. In various different implementations, the storage device 1030 may be a floppy disk device, a hard disk device, an optical disk device, or a tape device.

The input/output device 1040 provides input/output operations for the system 1000. In one implementation, the input/output device 1040 includes a keyboard and/or pointing device. In another implementation, the input/output device 1040 includes a display unit for displaying graphical user interfaces.

The features described can be implemented in digital electronic circuitry, or in computer hardware, firmware, software, or in combinations of them. The apparatus can be implemented in a computer program product tangibly embodied in an information carrier, e.g., in a machine-readable storage device, for execution by a programmable processor; and method steps can be performed by a programmable processor executing a program of instructions to perform functions of the described implementations by operating on input data and generating output. The described features can be implemented advantageously in one or more computer programs that are executable on a programmable system including at least one programmable processor coupled to receive data and instructions from, and to transmit data and instructions to, a data storage system, at least one input device, and at least one output device. A computer program is a set of instructions that can be used, directly or indirectly, in a computer to perform a certain activity or bring about a certain result. A computer program can be written in any form of programming language, including compiled or interpreted languages, and it can be deployed in any form, including as a stand-alone program or as a module, component, subroutine, or other unit suitable for use in a computing environment.

Suitable processors for the execution of a program of instructions include, by way of example, both general and special purpose microprocessors, and the sole processor or one of multiple processors of any kind of computer. Generally, a processor will receive instructions and data from a read-only memory or a random access memory or both. The essential elements of a computer are a processor for executing instructions and one or more memories for storing instructions and data. Generally, a computer will also include, or be operatively coupled to communicate with, one or more mass storage devices for storing data files; such devices include magnetic disks, such as internal hard disks and removable disks; magneto-optical disks; and optical disks. Storage devices suitable for tangibly embodying computer program instructions and data include all forms of non-volatile memory, including by way of example semiconductor memory devices, such as EPROM, EEPROM, and flash memory devices; magnetic disks such as internal hard disks and removable disks; magneto-optical disks; and CD-ROM and DVD-ROM disks. The processor and the memory can be supplemented by, or incorporated in, ASICs (application-specific integrated circuits).

To provide for interaction with a user, the features can be implemented on a computer having a display device such as a CRT (cathode ray tube) or LCD (liquid crystal display) monitor for displaying information to the user and a keyboard and a pointing device such as a mouse or a trackball by which the user can provide input to the computer.

The features can be implemented in a computer system that includes a back-end component, such as a data server, or that includes a middleware component, such as an application server or an Internet server, or that includes a front-end component, such as a client computer having a graphical user interface or an Internet browser, or any combination of them. The components of the system can be connected by any form or medium of digital data communication such as a communication network. Examples of communication networks include, e.g., a LAN, a WAN, and the computers and networks forming the Internet.

The computer system can include clients and servers. A client and server are generally remote from each other and typically interact through a network, such as the described one. The relationship of client and server arises by virtue of computer programs running on the respective computers and having a client-server relationship to each other. A number of embodiments have been described. Nevertheless, it will be understood that various modifications may be made without departing from the spirit and scope of this disclosure. Accordingly, other embodiments are within the scope of the following claims.

What is claimed is:

1. A computer-implemented method of providing a state-aware buffer, the method comprising:
    implementing a buffer between executable logic and a data repository, the executable logic performing processing steps in which information is used, a state of the information changing with each of the processing steps, the executable logic saving the state of the information to the buffer upon performance of each of the processing steps, the buffer being configured to concurrently maintain multiple states of the information corresponding to different instances of the information used by the executable logic at different times during runtime, the executable logic having a current version identifier that identifies a current state of the information from the multiple states and at least one earlier version identifier that identifies an earlier state of the information from the multiple states, the buffer configured to write a particular state of the multiple states to the data repository when the buffer no longer needs to maintain the particular state;
    providing the buffer with a function for performing an operation on at least one of the multiple states, wherein the function is configured to cause the buffer to compare the multiple states of the information, wherein the function is configured to cause the buffer to bring the information from one of the multiple states to another of the multiple states, wherein the function is further configured to update the data repository to reflect that the information has been brought to the other state; and
    providing an interface to the buffer for use by the executable logic in activating the function.

2. The computer-implemented method of claim 1, wherein the function is configured to cause the buffer to begin maintaining the multiple states of the information.

3. The computer-implemented method of claim 1, wherein the interface is configured so that semantics of the multiple states are maintained by the executable logic.

4. The computer-implemented method of claim 1, wherein the multiple states of the information indicate versions of an object that is recognized in the executable logic, wherein the object is configured to include nodes bearing the information, and wherein the multiple states correspond to states of the nodes.

5. The computer-implemented method of claim 1, wherein the multiple states of the information indicate versions of an object that is recognized in the executable logic, wherein the object is configured for a business-related functionality and provides at least one standard service.

6. The computer-implemented method of claim 1, wherein the multiple states of the information indicate versions of an object that is recognized in the executable logic, wherein the buffer is generic with regard to objects whose nodes are connected by composition associations.

7. The computer-implemented method of claim 6, wherein the buffer is associated with a configuration that maintains any aspects that are specific to the objects, and wherein implementing the buffer further comprises:
    accessing the configuration before the buffer is implemented; and
    deriving the buffer from a template, the buffer being specific to nodes of the at least one object;
    wherein the configuration is not accessed at runtime.

8. The computer-implemented method of claim 1, wherein the multiple states of the information indicate versions of an object that is recognized in the executable logic, wherein the object is configured to include a plurality of nodes, and wherein providing the buffer with the function further comprises configuring the function to access multiple instances of a first node without accessing an instance of a second node that is connected to the first node in the object.

9. A computer program product tangibly embodied in a computer-readable medium storage device and comprising instructions that when executed by a processor perform a method for providing a state-aware buffer, the method comprising:

implementing a buffer between executable logic and a data repository, the executable logic performing processing steps in which information is used, a state of the information changing with each of the processing steps, the executable logic saving the state of the information to the buffer upon performance of each of the processing steps, the buffer being configured to concurrently maintain multiple states of the information corresponding to different instances of the information used by the executable logic at different times during runtime, the executable logic having a current version identifier that identifies a current state of the information from the multiple states and at least one earlier version identifier that identifies an earlier state of the information from the multiple states, the buffer configured to write a particular state of the multiple states to the data repository when the buffer no longer needs to maintain the particular state;

providing the buffer with a function for performing an operation on at least one of the multiple states, wherein the function is configured to cause the buffer to compare the multiple states of the information, wherein the function is configured to cause the buffer to bring the information from one of the multiple states to another of the multiple states, wherein the function is further configured to update the data repository to reflect that the information has been brought to the other state; and providing an interface to the buffer for use by the executable logic in activating the function.

10. A computer-implemented method of using a state-aware buffer, the method comprising:

changing a first state of information from an object stored in a buffer implemented between executable logic and a data repository, the executable logic performing processing steps in which information is used, a state of the information changing with each of the processing steps, the buffer being configured to maintain concurrently multiple states of objects that are recognized in the executable logic and that correspond to different instances of the information used by the executable logic at different times during runtime, the executable logic having a current version identifier that identifies a current state of the information from the multiple states and at least one earlier version identifier that identifies an earlier state of the information from the multiple states, the buffer configured to write a particular state of the multiple states to the data repository when the buffer no longer needs to maintain the particular state;

holding a second state of the information in the buffer that reflects the change; and performing an operation in the buffer on at least one of the first and second states, the operation requested by the executable logic, wherein the operation includes comparing the first state with the second state, wherein the operation includes bringing the information in the buffer from the second state to the first state, wherein the operation further includes updating the data repository to reflect that the information has been brought to the first state.

11. The computer-implemented method of claim 10, wherein the buffer is generic with regard to objects whose nodes are connected by composition associations.

12. The computer-implemented method of claim 11, wherein the buffer is associated with a configuration that maintains any aspects that are specific to the objects, further comprising accessing the configuration at runtime.

13. The computer-implemented method of claim 10, further comprising:

receiving a request for access to a node in the buffer, the node being included in the information;

accessing multiple instances of a first node without accessing an instance of a second node that is connected to the first node in the object; and generating a response to the request based on the access.

14. A computer program product tangibly embodied in a computer-readable medium storage device and comprising instructions that when executed by a processor perform a method for using a state-aware buffer, the method comprising:

changing a first state of information from an object stored in a buffer implemented between executable logic and a data repository, the executable logic performing processing steps in which information is used, a state of the information changing with each of the processing steps, the buffer being configured to maintain concurrently multiple states of objects that are recognized in the executable logic and that correspond to different instances of the information used by the executable logic at different times during runtime, the executable logic having a current version identifier that identifies a current state of the information from the multiple states and at least one earlier version identifier that identifies an earlier state of the information from the multiple states, the buffer configured to write a particular state of the multiple states to the data repository when the buffer no longer needs to maintain the particular state; and performing an operation in the buffer on at least one of the first state and a second state, the operation requested by the executable logic, wherein the operation includes comparing the first state with the second state, wherein the operation includes bringing the information in the buffer from the second state to the first state, wherein the operation further includes updating the data repository to reflect that the information has been brought to the first state.

15. A system comprising:

a computer-readable medium storage device comprising a data repository;

executable logic, stored in a computer-readable medium storage device, for performing processing steps in which information is used, a state of the information changing with each of the processing steps, the executable logic having a current version identifier that identifies a current state of the information from the multiple states and at least one earlier version identifier that identifies an earlier state of the information from the multiple states;

a buffer implemented between the executable logic and the data repository, the buffer being operable to concurrently maintain states of the information corresponding to different instances of the information used by the executable logic at different times during runtime, the executable logic saving the state of the information to the buffer upon performance of each of the processing steps, the buffer configured to write a particular state of the multiple states to the data repository when the buffer no longer needs to maintain the particular state, the buffer having a function for performing an operation on at least one of multiple states of information from at least one object that is recognized in the executable logic, wherein the operation is at least one selected from the group consisting of: causing the buffer to begin maintaining the multiple states of the information; causing the buffer to compare the multiple states of the information; causing the buffer to bring the information from one of the multiple states to another of the multiple states; and combinations thereof, and wherein after the information is brought to the other state the data repository is updated; and an interface to the buffer for use by the executable logic in activating the function.

16. The system of claim 15, wherein the interface is configured so that semantics of the multiple states are maintained by the executable logic.

17. The system of claim 15, wherein the at least one object is configured to include nodes bearing the information, and wherein the multiple states correspond to states of the nodes.

18. The system of claim 15, wherein the buffer is generic with regard to objects whose nodes are connected by composition associations.

19. The system of claim 18, wherein the information is included in a plurality of nodes of the at least one object, each of the nodes including at least a data part and a key part.

20. The system of claim 19, wherein the buffer is configured to accept any type of the data parts.

21. The system of claim 15, wherein the buffer is associated with a configuration that maintains any aspects that are specific to the objects.

22. The system of claim 15 wherein the information is included in a plurality of nodes of the at least one object, and wherein the interface is further configured for requesting access to multiple instances of a first node without accessing an instance of a second node that is connected to the first node in the object.

23. A computer-implemented method of providing a node-oriented buffer, the method comprising:

implementing a buffer between executable logic and a data repository, the executable logic performing processing steps in which information is used, the buffer configured to hold multiple objects corresponding to different instances of the information used by the executable logic during runtime, each of the objects configured to include a plurality of nodes, at least one of the objects having (i) an alternative key association that contains an alternative key data type, and (ii) a first node that has a foreign key association to a second node, wherein implementing the buffer further comprises providing the buffer to be capable of maintaining multiple states of the information and providing the buffer with a function for performing an operation on at least one of the multiple states, wherein the function is configured to cause the buffer to compare the multiple states of the information, wherein the function is configured to cause the buffer to bring the information from one of the multiple states to another of the multiple states, wherein the function is further configured to update the data repository to reflect that the information has been brought to another state;

providing the buffer with a second function to access, after an instance of a node in an object in the buffer has been accessed, another instance of the node from another object that corresponds to a different instance of the information used by the executable logic without accessing other nodes in the another object; and providing an interface to the buffer for use by the executable logic in activating the function.

24. The computer-implemented method of claim 23, wherein each of the nodes includes at least a data part and a key part.

25. The computer-implemented method of claim 24, wherein implementing the buffer further includes configuring the buffer to accept any type of the data parts.

26. The computer-implemented method of claim 24, wherein implementing the buffer further includes configuring the buffer to organize the nodes by the key parts.

27. The computer-implemented method of claim 24, wherein implementing the buffer further includes providing each of the key parts with at least a node instance key, a parent node instance key, and a root node instance key.

28. The computer-implemented method of claim 23, wherein at least one of the objects is configured for a business-related functionality and provides at least one standard service.

29. The computer-implemented method of claim 23, wherein the buffer is generic with regard to objects whose nodes are connected by composition associations.

30. The computer-implemented method of claim 29, wherein the buffer is associated with a configuration that maintains any aspects that are specific to the objects, and wherein implementing the buffer further comprises:

accessing the configuration before the buffer is implemented; and deriving the buffer from a template, the buffer being specific to nodes of the at least one object;

wherein the configuration is not accessed at runtime.

31. A computer program product tangibly embodied in a computer-readable medium storage device and comprising instructions that when executed by a processor perform a method for providing a node-oriented buffer, the method comprising:

implementing a buffer between executable logic and a data repository, the executable logic performing processing steps in which information is used, the buffer configured to hold multiple objects corresponding to different instances of the information used by the executable logic during runtime, each of the objects configured to include a plurality of nodes, at least one of the objects having (i) an alternative key association that contains an alternative key data type, and (ii) a first node that has a foreign key association to a second node, wherein implementing the buffer further comprises providing the buffer to be capable of maintaining multiple states of the information and providing the buffer with a function for performing an operation on at least one of the multiple states, wherein the function is configured to cause the buffer to compare the multiple states of the information, wherein the function is configured to cause the buffer to bring the information from one of the multiple states to another of the multiple states, wherein the function is further configured to update the data repository to reflect that the information has been brought to the other state;

providing the buffer with a second function to access, after an instance of a node in an object in the buffer has been accessed, another instance of the node from another object that corresponds to a different instance of the information used by the executable logic without accessing other nodes in the another object; and providing an interface to the buffer for use by the executable logic in activating the function.

32. A computer-implemented method of using a node-oriented buffer, the method comprising:

receiving a request for access to a node in a buffer implemented between executable logic and a data repository, the executable logic performing processing steps in which information is used, the buffer configured to hold multiple objects corresponding to different instances of the information used by the executable logic during runtime, at least one of the objects having (i) an alternative key association that contains an alternative key data type, and (ii) a first node that has a foreign key association to a second node, the node being included in information from an object that is recognized in the executable logic;

accessing, in the buffer, multiple instances of the node from other objects that correspond to different instances of the information used by the executable logic without accessing other nodes in the other objects;

changing a first state of the information;

holding a second state of the information in the buffer that reflects the change; and performing an operation in the buffer requested by the executable logic, the operation performed on at least one of the first and second states, wherein the operation includes comparing the first state with the second state, wherein the operation includes bringing the information in the buffer from the second state to the first state;

updating the data repository to reflect that the information has been brought to another state; and generating a response to the request based on the access.

33. The computer-implemented method of claim 32, wherein each of the nodes includes at least a data part and a key part.

34. The computer-implemented method of claim 33, wherein accessing the multiple instances includes using the key parts.

35. The computer-implemented method of claim 34, wherein each of the key parts includes at least a node instance key, a parent node instance key, and a root node instance key.

36. The computer-implemented method of claim 32, wherein the buffer is generic with regard to objects whose nodes are connected by composition associations.

37. The computer-implemented method of claim 36, wherein the buffer is associated with a configuration that maintains any aspects that are specific to the objects, further comprising accessing the configuration at runtime.

38. A computer program product tangibly embodied in a computer-readable medium storage device and comprising instructions that when executed by a processor perform a method for using a node-oriented buffer, the method comprising:

receiving a request for access to a node in a buffer implemented between executable logic and a data repository, the executable logic performing processing steps in which information is used, the buffer configured to hold multiple objects corresponding to different instances of the information used by the executable logic during runtime, at least one of the objects having (i) an alternative key association that contains an alternative key data type, and (ii) a first node that has a foreign key association to a second node, the node being included in information from an object that is recognized in the executable logic;

accessing, in the buffer, multiple instances of the node from other objects that correspond to different instances of the information used by the executable logic without accessing other nodes in the other objects;

changing a first state of the information;

holding a second state of the information in the buffer that reflects the change; and performing an operation in the buffer requested by the executable logic, the operation performed on at least one of the first and second states, wherein the operation includes comparing the first state with the second state, wherein the operation includes bringing the information in the buffer from the second state to the first state;

updating the data repository to reflect that the information has been brought to another state; and generating a response to the request based on the access.

39. A system comprising:

a computer-readable medium storage device comprising a data repository;

executable logic stored in a computer-readable medium storage device and performing processing steps in which information is used;

a buffer implemented between the executable logic and the data repository, the buffer configured to hold multiple objects corresponding to different instances of the information used by the executable logic during runtime, each of the objects configured to include a plurality of nodes, at least one of the objects having (i) an alternative key association that contains an alternative key data type, and (ii) a first node that has a foreign key association to a second node changing a first state of the information;

holding a second state of the information in the buffer that reflects the change;

performing an operation in the buffer requested by the executable logic, the operation performed on at least one of the first and second states, wherein the operation includes comparing the first state with the second state, wherein the operation includes bringing the information in the buffer from the second state to the first state, wherein after the information is brought to another state the data repository is updated; and an interface to the buffer for use by the executable logic in requesting, after an instance of a node in an object in the buffer has been accessed, another instance of the node from another object that corresponds to a different instance of the information used by the executable logic without accessing other nodes in the another object.

40. The system of claim 39, wherein the buffer is generic with regard to objects whose nodes are connected by composition associations.

41. The system of claim 39, wherein each of the nodes includes at least a data part and a key part.

42. The system of claim 41, wherein the buffer is configured to accept any type of the data parts.

43. The system of claim 41, wherein the buffer organizes the nodes by the key parts.

44. The system of claim 41, wherein each of the key parts includes at least a node instance key, a parent node instance key, and a root node instance key.

45. The system of claim 39, wherein the buffer is associated with a configuration that maintains any aspects that are specific to the objects.

* * * * *